United States Patent [19]

Nagafuji

[11] Patent Number: 4,677,582
[45] Date of Patent: Jun. 30, 1987

[54] OPERATION PROCESSING APPARATUS
[75] Inventor: Motonobu Nagafuji, Hadano, Japan
[73] Assignee: Hitachi, Ltd., Tokyo, Japan
[21] Appl. No.: 484,846
[22] Filed: Apr. 14, 1983
[30] Foreign Application Priority Data
Apr. 19, 1982 [JP] Japan .................. 57-65200
[51] Int. Cl.⁴ .................. G06F 7/38; G05P 7/50
[52] U.S. Cl. .................. 364/749; 364/715; 364/784
[58] Field of Search .............. 364/736, 745, 768, 778, 364/781, 784, 748, 200 MS File, 900 MS File

[56] References Cited
U.S. PATENT DOCUMENTS 3,935,572  1/1976  Broniwitz et al. ............... 343/9
4,021,655  5/1977  Healy et al. .................. 364/749
4,109,310  8/1978  England et al. ................ 364/200
4,135,242  1/1979  Ward et al. .................... 364/200
4,296,469 10/1981  Gunter et al. .................. 364/200
4,434,459  2/1984  Holland et al. ................. 364/200
4,491,910  1/1985  Caudel et al. .................. 364/715
4,507,731  3/1985  Morrison ....................... 364/200

Primary Examiner—Archie E. Williams
Assistant Examiner—Dale M. Shaw
Attorney, Agent, or Firm—Antonelli, Terry & Wands

[57] ABSTRACT

An operation processing apparatus executes an instruction accompanied by addition/subtraction for one word and halfword operands at a high speed. An expander expands the sign of a second operand in its upper halfword bits to produce an expanded second operand having the same length as that of a first operand. An arithmetic unit operates the first operand and the expanded second operand.

7 Claims, 13 Drawing Figures

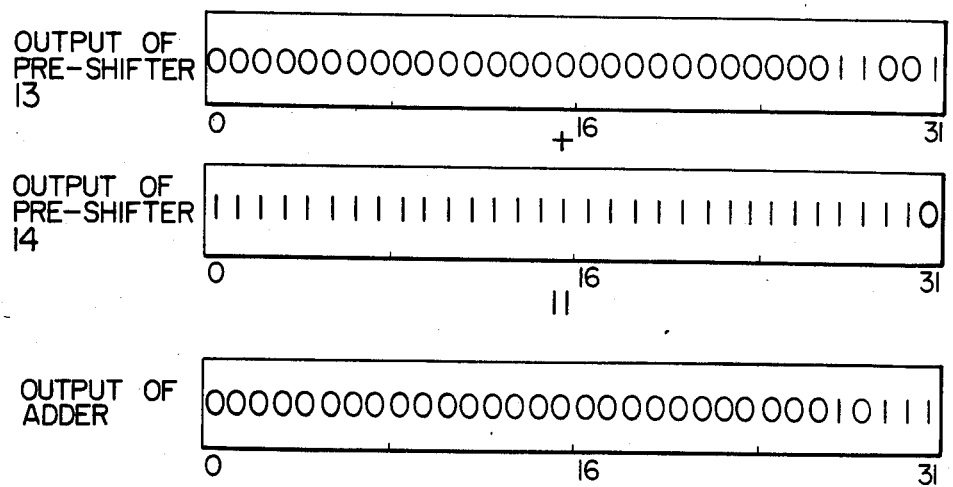
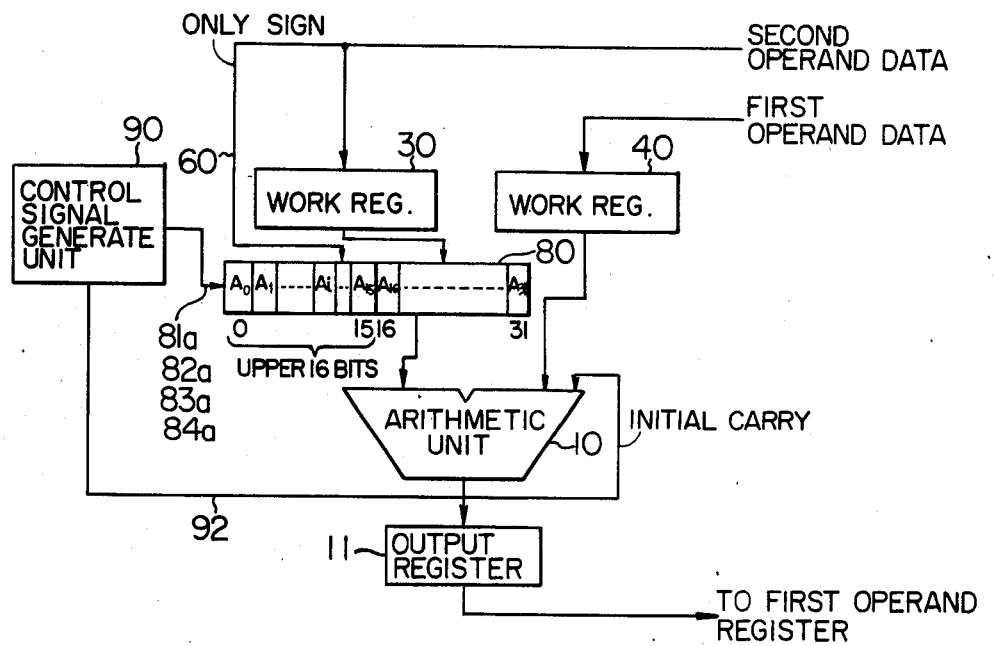

| BIT POSITION | 0 1 2 3 ------15 | 16 17 18 ---- 30 31 |
|---|---|---|
| EXPANDER INPUT | 0 ———————— 0 | 1 1 1 ------- 1 0 |
| CONTROL SIGNAL | HALF WORD ADDITION MODE | TRUE (THROUGH) |
| SECOND OPERAND SIGN | 1 (NEGATIVE) | |
| INPUT TO ARITHMETIC UNIT | 1 1 1 1 -------- 1 | 1 1 1 ------- 1 0 |

OPERATION PROCESSING APPARATUS

This invention relates to an operation processing apparatus adapted to execute an instruction accompanied by addition/subtraction of a halfword operand at high speeds.

FIG. 1 shows a format of an instruction for addition/subtraction of a one word (four bytes) or halfword (two bytes) operand. The format shown in FIG. 1 has an instruction code OP indicative of the type of operation, addition or subtraction, and of the type of a second operand, one word or halfword, as well, a register number code $R_1$ indicative of a register number in which a first operand of one word exists, and an address $ADD_2$ indicative of an address in a memory on which the second operand of one word or halfword exists.

FIG. 2 shows operand formats. In FIG. 2, a sign S of an operand is construed as being 0 (zero) when the operand is positive number and 1 (one) when the operand is negative number. A value exclusive of the sign and represented by Bs is of 15 bits for a halfword operand or is of 31 bits for a one word operand. In operation, a first operand of one word is added to or has subtracted therefrom a second operand of halfword or one word, and is stored in a register of one word as represented by the register number $R_1$ shown in FIG. 1.

The one word operand of positive sign is exemplified in terms of a wellknown fixed-point number in FIG. 3a to represent a decimal "+25" and the halfword operand of negative sign is exemplified also in terms of a fixed-point number in FIG. 3b to represent a decimal "−2". The instruction accompanied by addition/subtraction of the halfword includes an ADD HALFWORD instruction, a SUBTRACT HALFWORD instruction and a COMPARE HALFWORD instruction respectively for addition, subtraction and comparison of the one word first operand and the halfword second operand, and these instructions are described in "IBM System/370 Principles of Operation" (Ninth Edition) issued by International Business Machines Corporation in October, 1981.

In a prior art apparatus, at least two cycles are required to execute an addition/subtraction instruction for the halfword operand. More particularly, the sign of an addend or a subtrahend is expanded in an upper byte by means of a shifter, for example, during a first cycle and then inputted to an arithmetic unit during a second cycle, thereby completing an addition/subtraction operation. The prior art apparatus will be described in greater detail.

The prior art apparatus as exemplified in block form in FIG. 4 includes an arithmetic unit and components associated therewith, and it executes an add halfword instruction for the operands of FIG. 3a and FIG. 3b in accordance with procedures as shown in FIG. 5. In the following description, work registers, a shifter and the arithmetic unit are adapted for one word but they may of course be adapted for double words.

In operation, an add halfword instruction as shown in FIG. 1 is first decoded by a wellknown instruction advanced controller to read stored data of first and second operands, and the first and second operands are set in a work register 40 and the head of a work register 30, respectively. Thus, a one word operand as shown in FIG. 3a is set in the work register 40 and a halfword operand as shown in FIG. 3b is set in the first two bytes of the work register 30 in advance of the execution of a microprogram. In these work registers 30 and 40, data of different word lengths are present and the bit positions of lowermost bits are different with the result that outputs of the work registers 30 and 40 as they are can not be inputted to an arthmetic unit 10. Therefore, during a first execution cycle of the microprogram, the contents of the work register 30 are fed to a shifter 20 and therein subjected to 16-bit arithmetical right shifting. A result of shifting is again transferred to the work register 30 via an output register 21 and a signal line 50. The contents of the work register 30 before the transfer, representing the second operand initially set is shown at section (a) in FIG. 6 and the contents thereof after the transfer, representing the second operand subject to the 16-bit right shifting is shown at section (b) in FIG. 6. Since the 16-bit right shifting is effected by the shifter 20 arithmetically in consideration of the sign, the work register 30 is newly added with negative signs 1s in the upper 16 bits after the transfer, as shown at (b) in FIG. 6.

After the lowermost bit positions in the work registers 30 and 40 are made coincident with each other in this manner, the contents of the work registers 30 and 40 are inputted to the arithmetic unit 10 via pre-shifters 13 and 14, respectively, during a second execution cycle of the microprogram. The pre-shifters 13 and 14 simply perform a "pass through" function, so that the data is simply passed through these pre-shifters. The result of addition at the arithmetic unit 10 is a value which equals a decimal "23" pursuant to the wellknown fixed-point number addition, as shown in FIG. 7. The output of the arithmetic unit is transferred to a first operand register via an output register 11 during a final stage of the second execution cycle and stored therein to complete the instruction.

In the case of a subtract halfword instruction and a compare halfword instruction, the pre-shifter 13 acts as a complementer and an initial carrier "1" is fed to the lowermost bit position of the arithmetic unit 10 during the second execution cycle, and apart from the above points, the same operation as in the addition is carried out during the first execution cycle.

As will be seen from the foregoing, the execution of the addition/subtraction instruction for the halfword operand according to the prior art apparatus requires two cycles. On the other hand, an addition/subtraction instruction for a one word second operand which does not need the sign expansion can be executed during one cycle since the second operand set in the work register 30 has already a heading sign and its lowermost bit position coincides with a lowermost bit position of a first operand set in the work register 40, so that the second operand as it is can be inputted to the arithmetic unit without resort to the procedure of right shifting by means of the shifter. Disadvantageously, for the execution of the addition/subtraction instruction, the time is thus doubled for the halfword operand as compared to the time for the one word operand, thereby detracting the use of the halfword operand in favor of saving memory capacity intended by software designers.

In the past, with a view to complete the execution of the addition/subtraction instruction for the halfword operand within one cycle, a method has been proposed wherein a bit of a second operand corresponding to the sign bit is expanded by 16 bits before the second operand is set in a work register 30 by means of a instruction advanced controller, the halfword operand per se is set in the second half of the work register, and the expanded 16-bit sign is set in the first half. With this method, however, there needs an additional gate circuit for the sign expansion which fulfills itself only when the addition/subtraction instruction for the halfword operand takes place, and the transfer of data to the work register is delayed by being passed through the gate circuit even when the instruction advanced controller operates at high speed for rapid transfer of the second operand read out of the memory, thus delaying the overall processing speed.

An object of this invention is to provide an operation processing apparatus capable of executing addition/subtraction of a halfword operand and a one word operand at the same speed as that for addition/subtraction of one word operands, without causing a delay in the overall processing speed.

According to the invention, there is provided an operation processing apparatus comprising first register means in which a first operand having a sign is set, and second register means in which a second operand of a smaller length than that of the first operand having a sign is set, expanding means connected to the second register to produce an expanded second operand having additional signs based on the sign of the second operand in upper bits and the second operand in lower bits so that the second operand has the same length as that of the first operand, and arithmetic means for operating said first operand from said first register means and said expanded second operand from said expanding means.

Other objects, features and advantages of the invention will become apparent from the following detailed description taken in conjunction with the accompanying drawings, in which:

FIGS. 6 and 7 show examples of instructions executed with the prior art apparatus;

FIG. 8 is a block diagram of an operation processing apparatus embodying the invention;

Figure 1:
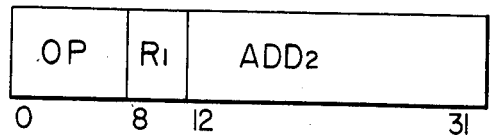
FIG. 1 shows a format of an addition/subtraction instruction for a one word or halfword operand.
Figure 2:
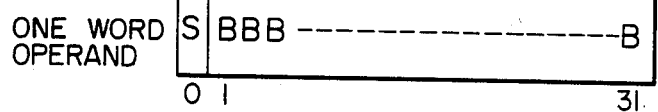
FIG. 2 shows formats of the one word operand and the halfword operand.

Referring to FIG. 8, there is shown a preferred embodiment of an operation processing apparatus according to the present invention. As shown, a first operand of one word is set in a work register 40, and a second operand of halfword is set in a work register 30. The register 30 has a one word capacity, and the second operand is transferred thereto from a memory not shown so as to be set in the lower 16-bit positions of the register 30. All the upper 16 bits of the register 30 are normally rendered 0 (zero). Only a sign of the second operand is transferred to an expander 80. The sign of the second operand may of course be derived from the work register 30. The expander 80 is responsive to a signal from a control signal generator unit 90 to produce an expanded second operand having a one word length similar to that of the first operand. An arithmetic unit 10 is adapted to add the first operand from the work register 40 and the expanded second operand from the expander 80. The expander 80 also has the function of making the second operand complement when the instruction is a SUBTRACT HALFWORD (SH) instruction or a COMPARE HALFWORD (CH) instruction. Accordingly, the arithmetic unit 10 having only the function of addition is sufficient for performing subtraction. In the case of the SH instruction and the CH instruction, an initial carry is fed from the control signal generator unit 90 to the lowermost bit of the arithmetic unit 10.

Figure 9:
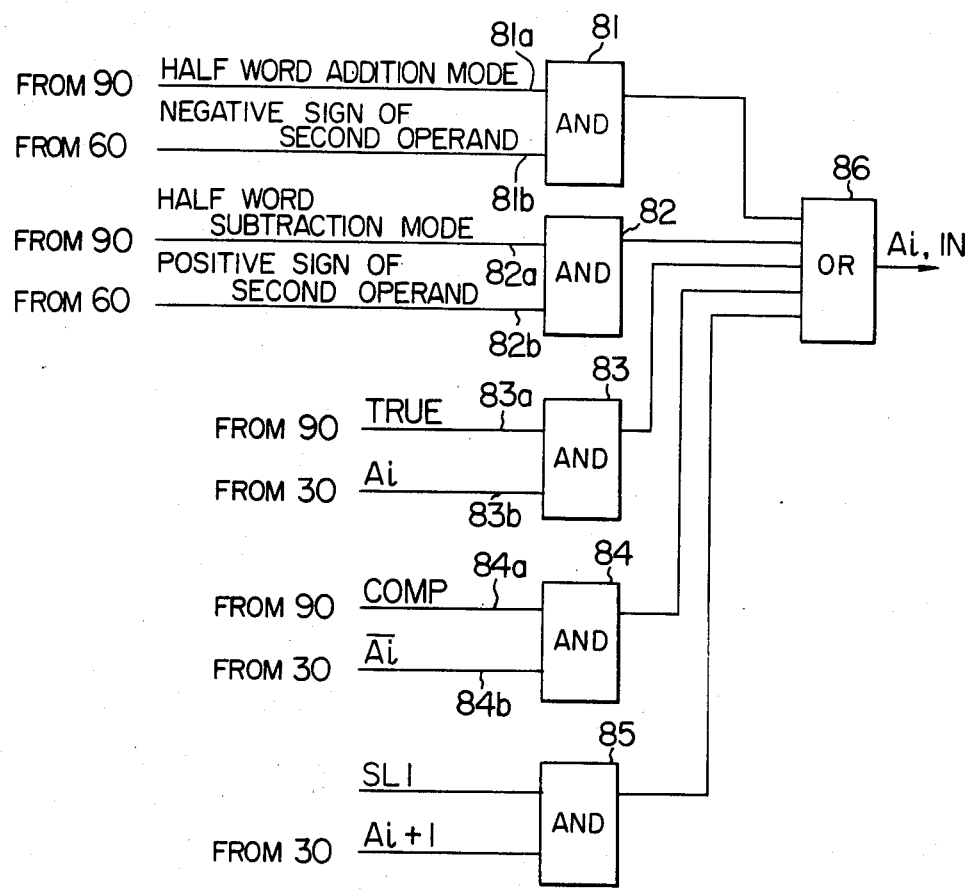
FIG. 9 is a block diagram of an expander shown in FIG. 8.

FIG. 9 shows details of the 32-bit expander 80 in respect of an i-th bit (Ai). The ordinary pre-shifter, like the pre-shifter 13 shown in FIG. 4, has at most the function of "through" (TRUE; passage of data without modification) complementing,(COMP; inversion for complement), and one to three-bit left or right shifting. AND circuits 83, 84 and 85 shown in FIG. 9 perform the above function, where the shiftings other than one bit left shifting designated by SL 1 are not illustrated for simplification of illustration.

The expander 80 of the present invention is featured by AND circuits 81 and 82 operable with each of the 0-th to 15-th bits ($0 \geq i \geq 15$) of the instruction accompanied by addition/subtraction of the halfword operand. More particularly, when the halfword addition mode is designated by a signal decoded from the instruction code OP of the instruction shown in FIG. 1 or by the like signal and the second operand transferred to the work register 30 has the negative sign, the AND circuit 81 of FIG. 9 is enabled to produce an output "1" which is fed via an OR circuit 86 to the corresponding bit of the arithmetic unit 10 as an arithmetic unit input $AiI_N$. Conversely, in progress of the instruction accompanied by halfword subtraction (SH or CH) instruction), the AND circuit 82 is responsive to the positive sign of the second operand to produce an output "1". During the halfword addition/subtraction operation, the ordinary AND circuits 83 to 85 for 0-th to 15-th bits remain disabled. These AND circuits 83 to 85 are also provided for 16-th to 31st bits (the lower bits) ($16 \leq i \leq 31$) and these bits are enabled thereby. Only an expander corresponding to the first half of 16 bits in the work register 30 is associated with the AND circuits 81 and 82 whereas the second half of 16 bits are not associated therewith.

Figure 10:
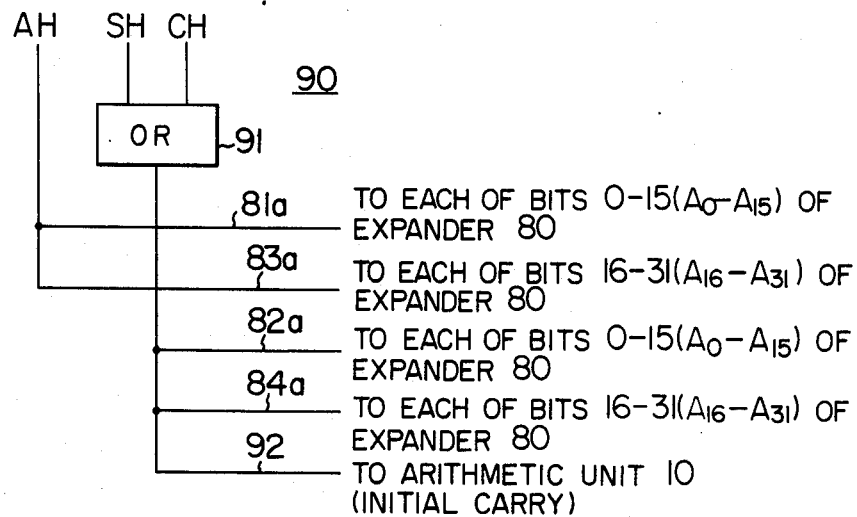
FIG. 10 is a block diagram of a control signal generator unit shown in FIG. 8.

FIG. 10 shows details of the control signal generator 90 of FIG. 8 which are essential to the present invention. Signals AH, SH and CH are decoded signals of instructions not shown. The signal AH is rendered "1" upon occurrence of the add halfword instruction, the signal SH is rendered "1" upon occurrence of the subtract halfword instruction and the signal CH is "1" upon occurrence of the compare halfword instruction. The signal AH is fed on a line 81a so as to be inputted to all the AND circuits 81 associated with 0-th to 15-th bits of the expander 80, and is also fed on a line 83a so as to be inputted to the lower half of the AND circuits 83 associated with 16-th to 31st bits of the expander 80. The output of an OR circuit 91 is fed on a line 82a so as to be inputted to all the AND circuits 82 associated with 0-th to 15-th bits of the expander 80, fed on a line 84a so as to be inputted to the lower half of the AND circuits 84 associated with 16-th to 31st bits of the expander 80, and also fed on a line 92 so as to act as the aforementioned initial carry signal.

Figure 3A:
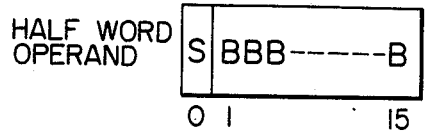
FIG. 3a shows an example of the one word operand.
Figure 3B:
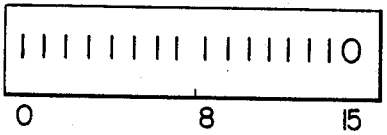
FIG. 3b shows an example of the halfword operand.
Figures 11, 12:
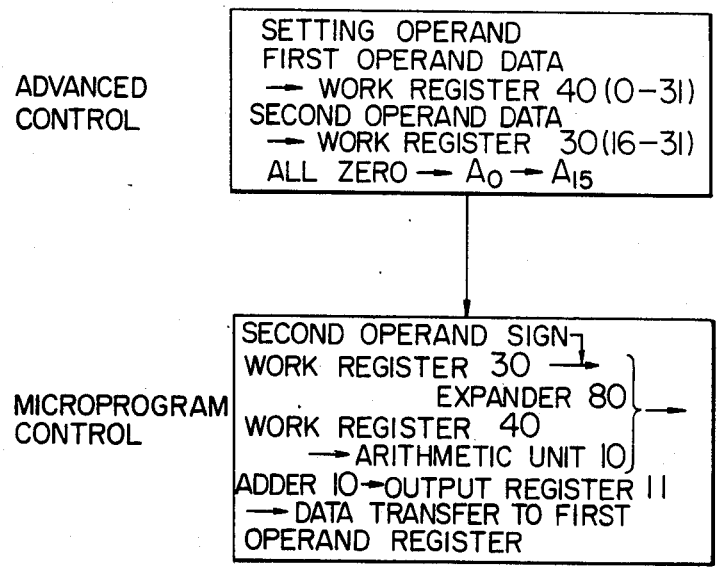
FIG. 11 shows the operation of the expander according to the invention.
FIG. 12 shows an execution procedure of a halfword addition instruction with the operation processing apparatus according to the invention.

FIG. 11 shows the operation of the expander 80 with data as exemplified in FIG. 3, and FIG. 12 shows the operational procedure.

The instruction advanced controller sets "0" in the first half (0-th to 15-th bits) of the work register 30 and the second operand data (111 . . . 10) in the second half (16-th to 31st bits), and the "0" and the second operand data are inputted to the expander 80. Only a control signal representative of the halfword addition mode is fed to the first half of the expander and other control signals are inhibited. Accordingly, the second operand is negative and the AND circuits 81 of FIG. 9 are enabled to make "1" all the outputs of the 0-th to 15-th bits of the OR circuit 86, that is, the inputs to the arithmetic unit 10. In the case of addition, a control signal representative of "through" (TRUE) is fed to 16-th to 31st bits of the expander and the set second operand data, as it is, is fed to the arithmetic unit. The output of the expander 80 produces a pattern similar to that shown in FIG. 7. Addition is executed subsequently in a similar manner to the prior art and a result of the addition is stored. When the second operand has the positive sign, the outputs of all the AND circuits associated with 0-th to 15-th bits of the expander 80 are rendered "0", while lower 16-th to 31st bits are the same as those described previously.

In the case of the halfword subtraction, for upper 16 bits (0-th to 15-th bits) of the expander 80, the AND circuits 82 of FIG. 9 respond to the positive sign to make the output of the expander "1" and for lower 16 bits (16-th to 31st bits), the COMP (complement) control signal is provided so as to input a complement of the second operand to the arithmetic unit 10. At this time, the lowermost bit position of the arithmetic unit 10 receives the initial carrier to assure the execution of subtraction normally. When the second operand has the negative sign, the outputs of all the AND circuits 82 associated with 0-th to 15-th bits of the expander 80 are rendered "0". The lower 16-th to 31st bits are the same as those described previously. Accordingly, in the case of the instruction accompanied by subtraction, the upper 0-th to 15-th bits of the expanded second operand are inverted with respect to those of the second operand.

Figure 4:
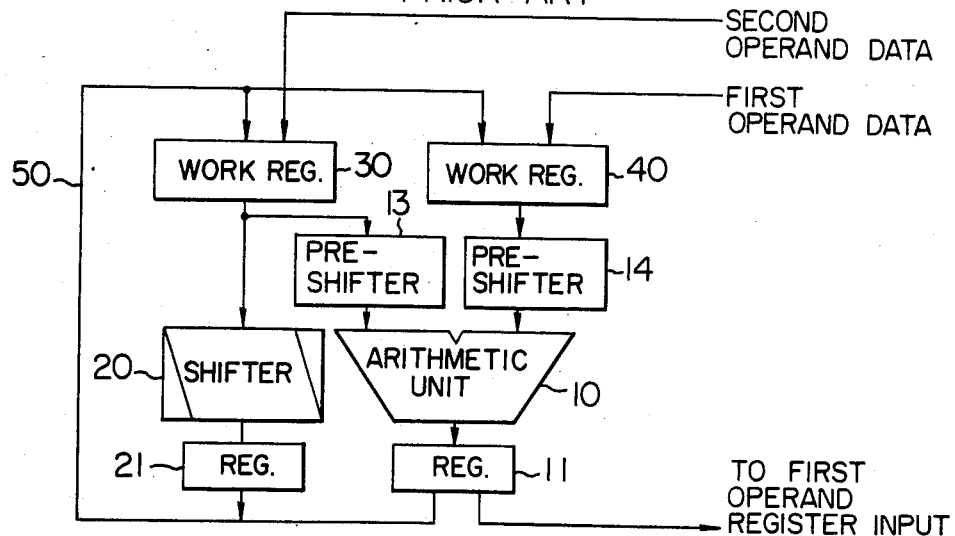
FIG. 4 is a block diagram showing a prior art operation processing apparatus.
Figure 5:
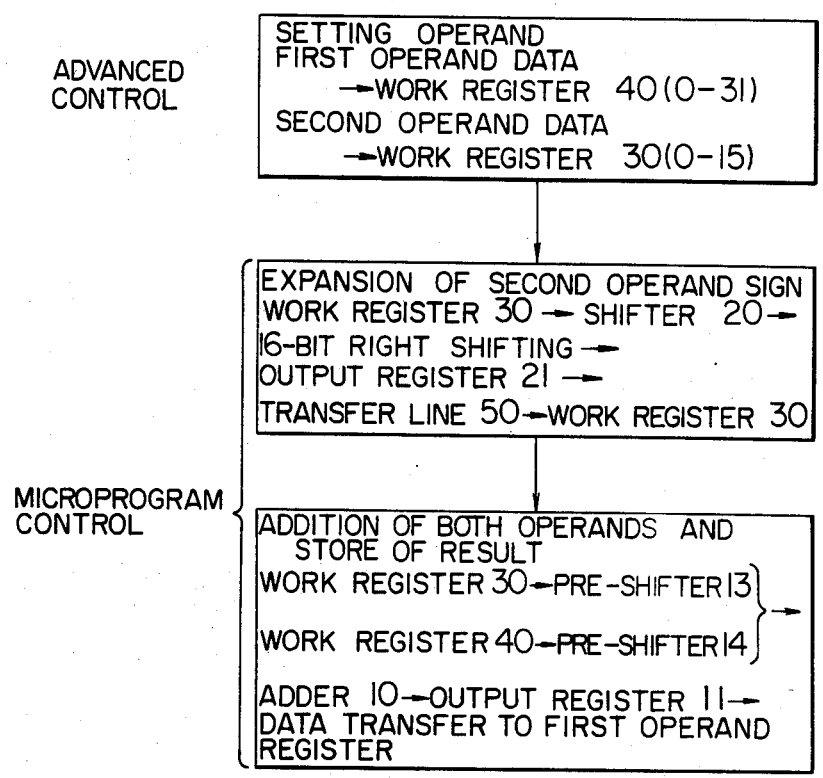
FIG. 5 shows an execution procedure of a halfword addition instruction with the prior art apparatus.
Figure 6:
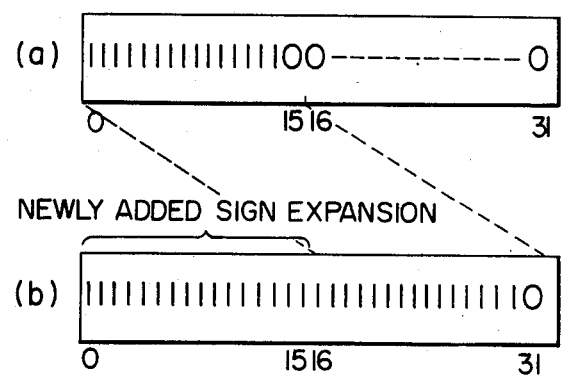

When other instructions than the AH, SH and CH instructions are additionally provided, the output of the work register 40 may be inputted to the arithmetic unit 10 via the pre-shifter 14 as in the arrangement of FIG. 4.

As has been described, according to the invention, the sign expansion of the second operand can be effected at the same speed as that of the prior art pre-shifter only during the first execution cycle to complete the instruction accompanied by addition/subtraction of the halfword operand without impairing performance of the pre-shifting. Further, a hardware added to the expander is simple, including 32 additional AND circuits for 16 bits, for example, and the number of the additional peripheral control circuits is minimized, thereby making it possible to materialize the operation processing apparatus at low cost.

What is claimed is:

1. An operation processing apparatus comprising:
   first register means for holding a first operand having a sign bit;
   second register means for holding a second operand having a sign bit, the length of said second operand being smaller than that of the first operand;
   expanding means connected to the second register means to produce an expanded second operand having additional bits based on the sign bit of said second operand in the upper bits thereof and having said second operand in the lower bits thereof so that the expanded second operand has the same length as that of said first operand, said expanding means including first gate means for outputting the second operand in said second register as the lower bits of said expanded second operand, and second gate means for outputting additional bits based on the sign bit of said second operand to form the upper bits of said expanded second operand, said second gate means including a plurality of gates each corresponding to a respective one of the upper bits of said expanded second operand, said sign bit being applied in common to an input of each of said plurality of gates; and
   arithmetic means for executing an arithmetic operation on said first operand from said first register means and said expanded second operand from said expanding means.

2. An operation processing apparatus according to claim 1 wherein said first operand comprises a one word operand and said second operand comprises a half-word operand.

3. An operation processing apparatus according to claim 2 wherein said first gate means operates to pass said second operand through as it is, and said second gate means passes the sign bit of said second operand in each of the upper halfword bits of the expanded second operand.

4. An operation processing apparatus according to claim 3 wherein said arithmetic means executes a addition operation.

5. An operation processing apparatus according to claim 1 wherein said expanding means includes control means responsive to execution of a subtraction or compare operation for controlling said first gate means to pass a complement of said second operand and said second gate means to pass the inverted signal bit of said second operand for applying an initial carry bit to the lowest bit position of said arithmetic means.

6. An operation processing apparatus according to claim 5 wherein said first operand comprses a one word operand and asid second operand comprises a halfword operand.

7. An operation processing apparatus according to claim 6 wherein said control means is responsive to execution of a subtraction or compare operation for controlling said second gate means to pass the inverted sign bit of said second operand in each of the upper halfword bits of the expanded second operand.

* * * * *